June 28, 1960

B. B. DAYTON 2,942,615

LIQUID SEALS

Filed Nov. 25, 1957

INVENTOR.
BENJAMIN B. DAYTON
BY Christie, Parker & Hale
ATTORNEYS

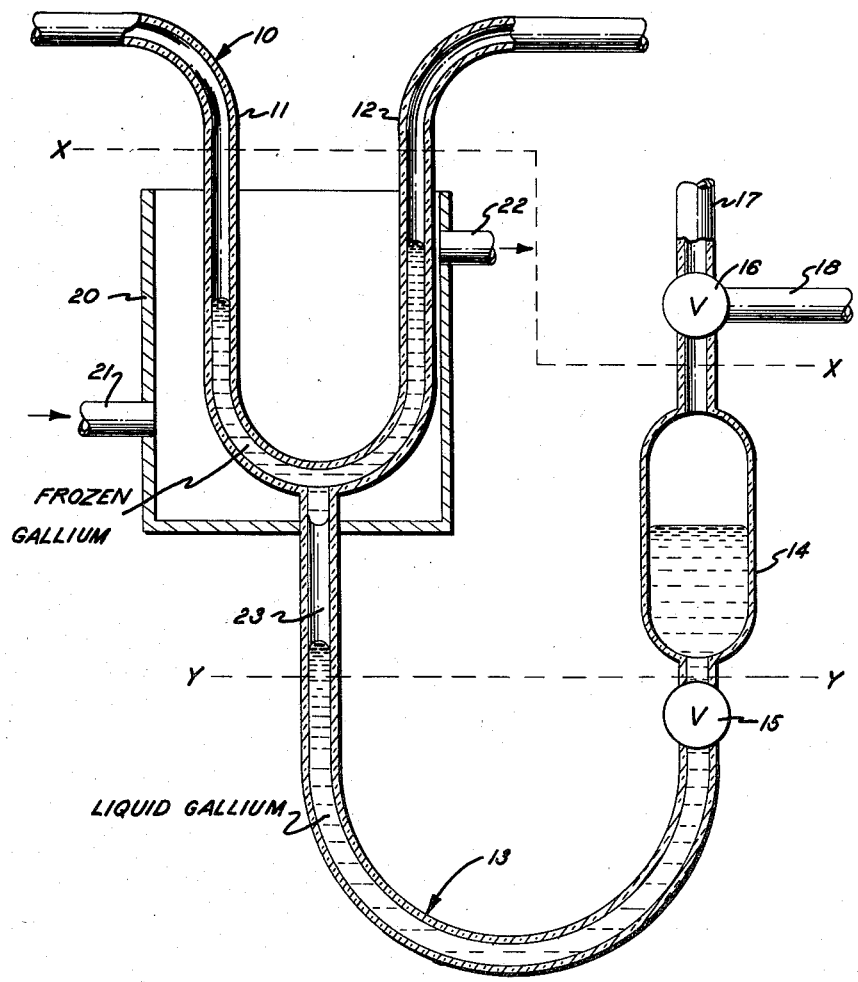

United States Patent Office 2,942,615
Patented June 28, 1960

2,942,615
LIQUID SEALS

Benjamin B. Dayton, Rochester, N.Y., assignor, by mesne assignments, to Consolidated Vacuum Corporation, Rochester, N.Y., a corporation of New York Filed Nov. 25, 1957, Ser. No. 698,505

13 Claims. (Cl. 137—248)

This invention relates to apparatus employing liquid seals and particularly to devices in which liquid seals are employed under high vacuum. This application is a continuation-in-part of my co-pending application Serial No. 558,382 filed January 10, 1956, which in turn is a continuation-in-part of my earlier application Serial No. 363,170, filed June 22, 1953 (now U.S. Patent No. 2,771,900, granted November 27, 1956).

In equipment operated under high vacuum it is often necessary to seal two zones from each other, for example, two zones between which a differential pressure exists. Mercury seals have been proposed for this purpose, but have not proved entirely satisfactory because mercury has relatively high vapor pressure. In consequence, the mercury is evaporated within the equipment and causes contamination.

I have developed seal structures employing gallium which overcome completely the defects inherent in mercury seals in high vacuum equipment. Gallium, which becomes liquid at 29.75° C. (approximately room temperature) has a lower vapor pressure than mercury. I have discovered that gallium also has another useful and probably unique property in that it wets and adheres to smooth surfaces, particularly smooth glass surfaces, but does not wet or adhere to rough surfaces, say ground or etched glass surfaces, unglazed porcelain or etched or sand blasted metal. In the practice of the instant invention I make use of these two properties of gallium by roughening a solid surface of seals where the liquid sealant should not adhere and employing smooth surfaces where it is desirable that the sealant (gallium) should adhere. In a preferred form of the apparatus of my invention I provide means for freezing the gallium in a seal or valve when it is closed, thereby increasing the strength of the seal and permitting it to withstand a greater differential pressure without leakage.

In summary, my invention contemplates a trap in a conduit and a body of liquid gallium in the trap forming a liquid seal therein, the interior of the trap in contact with the gallium having a roughened surface to which the gallium does not adhere. One form of the device of my invention is provided with means for flowing gallium into and out of the trap to close and open the seal. In a second form, the gallium is kept in a pool and a seal is made and broken by moving a member into and out of this pool.

In both of the foregoing forms of the invention I prefer to provide means disposed in thermally conductive relationship with the pool of gallium for lowering its temperature below the freezing point and holding it in frozen condition when the seal is closed, thereby strengthening the seal and increasing the allowable pressure differential which may be maintained across the seal without leakage.

The walls of the seal or trap in which the gallium is contained and the wall of the surrounding jacket should be transparent, or at least translucent, so as to permit inspection of the gallium therein.

These and other aspects of my invention will be understood more thoroughly in the light of the following detailed description taken in conjunction with the accompanying drawings, in which:

Fig. 1A is a diagram similar in all respects to that of Fig. 1, except that part of the gallium in the device is frozen to improve the seal.

Figure 1:
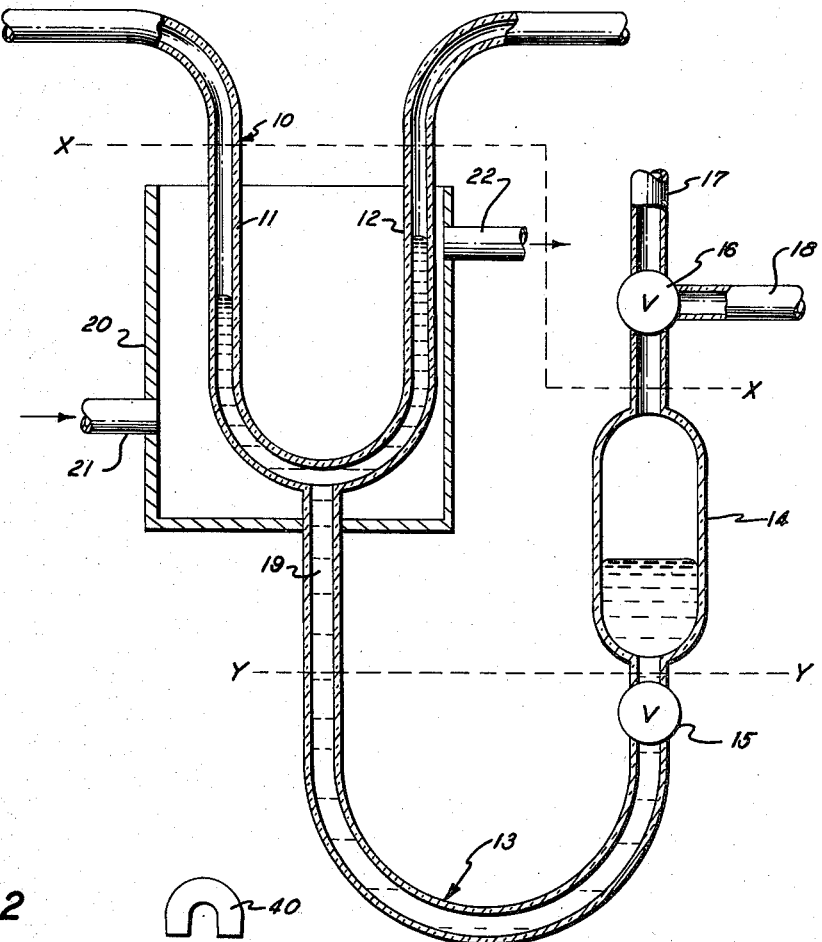
Fig. 1 is a diagram in vertical section of a type of U-tube seal constructed in accordance with my invention and employing gallium as a sealant, the device also being provided with means for freezing the gallium in the seal when it is closed and liquifying the gallium in the seal when it should be opened.

The seal of Fig. 1 comprises a transparent glass U-tube 10 which may be connected between two zones of different pressure by its respective legs 11, 12. A second transparent glass U-tube 13 is connected by its left hand leg to the bottom of the first U-tube and is disposed below it. The other, or right hand leg of the second U-tube is connected to a transparent glass bulb or reservoir 14 which is disposed above it, a valve 15 being disposed where the second U-tube connects to the reservoir. The upper end of the reservoir is connected through a two-way valve 16 to either one of two tubular branches 17, 18.

A column 19 of liquid gallium is disposed in the device and when it is high enough in the first U-tube (which constitutes the trap) this column acts to seal the two legs of this tube from each other. When the two legs of the first U-tube are to communicate with each other the valve 15 is opened to permit the gallium in liquid form to run back by gravity into the reservoir. When the two legs of the first U-tube are to be sealed from each other, the gallium column is forced from the reservoir into the first U-tube by fluid pressure exerted through either of the tubular branches 17, 18.

The inside surface of the first U-tube, the upper portion of the left hand leg of the second U-tube, and the inside of the reservoir are all etched and thereby roughened to the point that gallium will not adhere to them. The line X—X on Fig. 1 shows the upper limits of the etching in the legs of the first U-tube and in the reservoir. The line Y—Y shows the lower limits of the etching in the left hand leg of the second U-tube and in the reservoir. The etching has two advantages. It prevents the gallium from adhering to the inside surfaces and thus permits one to observe the position of the gallium in the device. It also prevents the gallium from creeping along the inside surfaces into adjacent zones where harm can be done through contamination and where gallium can be lost. As indicated above, the interior of the second U-tube below the line Y—Y is unetched so that gallium will adhere to this portion of the second U-tube. This adherence gives positive protection against leakage of air or other fluid from the space above the gallium in the reservoir through the second U-tube into the first U-tube and the vacuum system to which the legs of the first U-tube are connected.

As noted above, gallium melts at 29.75° C. and so when the gallium is to be moved in and out of the seal, it should be maintained at a temperature at which the gallium is liquid. Even when the gallium is liquid its vapor pressure is negligible up to a temperature of 500° C., so that contamination is not a serious problem even when the operation is conducted at high temperatures. This is an outstanding advantage in the operation of high vacuum systems at high temperatures.

When the seal is required to withstand a high differential pressure between the legs 11, 12 it is desirable to freeze the gallium in the first U-tube. I have found that the gallium can be frozen in the seal without destroying the seal and, in fact, actually increasing the differential pressure which it will withstand. Accordingly, the apparatus of Figs. 1 and 1A is provided with a transparent jacket 20, made of plastic or the like, which surrounds the gallium body in the first U-tube and is in thermally conductive relationship with this gallium through the walls of this U-tube. Means are provided for circulating a cooling fluid, say brine, through the jacket. Thus, brine may be pumped into the jacket through an inlet pipe 21 and withdrawn from the jacket through an outlet pipe 22. The temperature of the brine may be adjusted to freeze or liquify gallium, as needed.

I use the term "transparent jacket" to include those in which only a portion thereof, say the front panel, is transparent to permit observation of the gallium levels in the first U-tube.

Fig. 1 shows the seal in the first U-tube in a closed condition with liquid gallium as the sealant. However, the strength of the seal can be increased markedly if the gallium in the first U-tube is frozen by circulating cold brine through the jacket (see Fig. 1A). After the gallium in the first U-tube is frozen suction is applied to the still-liquid gallium in the second U-tube and the reservoir through either of the tubular branches 17, 18. This causes the liquid gallium to drop in the left hand leg of the second U-tube to leave an evacuated gap 23 just below the frozen gallium. The evacuated gap prevents direct heat transfer between the frozen and liquid gallium and confines the freezing action to the seal proper in the first U-tube.

When the seal of Figs. 1 and 1A is to be broken by removing the gallium from the first U-tube, warm brine is circulated through the jacket. This thaws the frozen gallium in a matter of minutes and permits it to be sucked out of the first U-tube into the reservoir.

Figure 2:
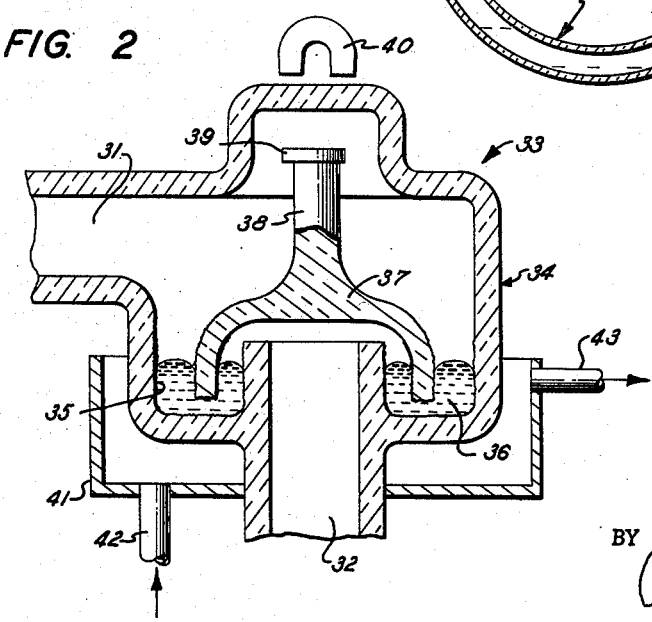
Fig. 2 is a diagram in vertical section of a cup-type liquid seal in accordance with my invention and employing gallium as a sealant, with means for liquifying and solidifying the gallium.

In the device of Fig. 2 a horizontal conduit 31 is to be sealed from a lower vertical conduit 32 by means of a valve 33 having a body 34 into which the lower conduit extends. An annular trap 35 surrounds the lower conduit where it enters the valve body and contains an annular pool 36 of gallium. An annular valve cap 37 may be moved up out of the pool and down into the pool by means of a stem 38 having a piece of magnetic material 39 (say a piece of soft iron) on its upper end. When a magnet 40 is placed outside the seal adjacent the magnetic material, the valve cap may be pulled out of the pool of gallium and the seal thus opened. When the magnet is removed the cap drops into the pool of gallium to make an effective seal.

The inside surface of the annular trap is roughened so that wetting by the gallium is prevented. Similarly, that portion of the cap that comes into contact with the gallium in the trap is also rough. Thus, as in the case of the apparatus of Fig. 1, the gallium is prevented from migrating out of the trap by the roughened surfaces.

The structure of Fig. 2, like that of Fig. 1, is adapted to be constructed entirely out of glass, in which case the roughening already described is conveniently accomplished by etching the glass or sand blasting it.

When the seal of Fig. 2 should withstand relatively high pressure differential between the conduit 31 and the conduit 32 it is desirable to pump brine through the jacket 41. This annular jacket surrounds the gallium pool and is in thermally conductive relationship with it. Cold brine may be circulated through the jacket by means of an inlet pipe 42 and an outlet pipe 43. Thus the pool of gallium in the seal may be frozen after the seal is made, i.e. with the seal cap inserted into the pool. When the seal is to be opened the gallium is thawed, preferably by pumping warmer brine through the jacket and after the gallium is thawed the cap may be pulled up out of the pool to open the seal.

I claim:

1. In a device having a conduit with a liquid seal therein, the combination which comprises a trap in the conduit, and a body of gallium in the trap and forming a seal therein, the interior of the trap in contact with the gallium and adjacent thereto having a roughened surface to which the gallium does not adhere so that the gallium does not creep out of the trap.

2. Apparatus according to claim 1 provided with means for flowing gallium into and out of the trap to close and open it.

3. In a device having a conduit with a liquid seal therein, the combination which comprises a trap in the conduit, a body of liquid gallium in the trap and forming a seal therein, the interior of the trap in contact with the gallium and adjacent thereto having a roughened surface to which the gallium does not adhere so that the gallium does not creep out of the trap, and means disposed in thermally conductive relationship with the trap for freezing the gallium in the trap.

4. In a device having a conduit with a liquid seal therein, the combination which comprises a trap in the conduit having a translucent wall, and a body of liquid gallium in the trap and forming a liquid seal therein, the interior of the trap in contact with the gallium and adjacent thereto having a roughened surface to which the gallium does not adhere, so that the gallium does not tend to creep out of the trap and obscure the level of gallium in the trap.

5. In a device having a conduit with a liquid seal therein, the combination which comprises a trap in the conduit and a body of liquid gallium in the trap and forming a liquid seal therein, the interior of the trap in contact with the gallium and adjacent thereto having a roughened surface to which the gallium does not adhere so that the gallium does not migrate out of the trap, and a member forming part of the trap and movable in and out of the pool of gallium to close and open the trap.

6. In a device having a conduit with a liquid seal therein, the combination which comprises a trap in the conduit and a body of liquid gallium in the trap and forming a liquid seal therein, the interior of the trap in contact with the gallium and adjacent thereto having a roughened surface to which the gallium does not adhere so that the gallium does not creep out of the trap and a member forming part of the trap and movable in and out of the pool of gallium to close and open the trap, the portion of this member which comes in contact with the gallium also having a roughened surface to which the gallium does not adhere, so that the gallium is not carried out of the trap when the member is moved out of the pool of gallium.

7. In a device having a conduit with a liquid seal therein, the combination which comprises a trap in the conduit and a body of liquid gallium in the trap and forming a liquid seal therein, the interior of the trap in contact with the gallium and adjacent thereto having a roughened surface to which the gallium does not adhere so that the gallium does not tend to creep out of the trap, a member forming part of the trap and movable in and out of the pool of gallium to close and open the trap, and means disposed in thermally conductive relationship with the trap for freezing the gallium in the trap when the member is in the pool of gallium.

8. In a device having a conduit with a liquid seal therein, the combination which comprises an upwardly extending U-tube, a conduit connected to the U-tube and projecting downwardly therefrom, a body of liquid gallium, and means for moving the liquid gallium in and out of the U-tube through the conduit, the interior of the U-tube having a rough surface to which the gallium will not adhere, means for freezing the gallium in the U-tube, and means for sucking unfrozen gallium downward in the conduit to produce an evacuated space in the conduit between the frozen gallium in the U-tube and the unfrozen gallium in the conduit.

9. Apparatus according to claim 8 in which the U-tube is disposed in a jacket for cooling medium, and at least part of the conduit is outside said jacket so that the gallium therein will not be frozen.

10. In a device having a conduit with a liquid seal therein, the combination which comprises an upwardly extending first U-tube, an upwardly extending second U-tube having one leg connected directly to the bottom of the first U-tube, a body of liquid gallium, and means for moving the body of liquid gallium in and out of the first U-tube through the second U-tube, the lower interior of the first U-tube and the upper portion of the interior of the leg of the second U-tube that is connected to the bottom of the first U-tube having rough surfaces to which the gallium will not adhere.

11. Apparatus according to claim 10 provided with a reservoir connected to that leg of the second U-tube that is not connected directly to the bottom of the first U-tube, the interior of said reservoir having a rough surface to which gallium will not adhere.

12. Apparatus according to claim 10 in which the interior of the lower portion of the second U-tube is smooth so that gallium will adhere to it.

13. Apparatus according to claim 10 provided with a jacket around the first U-tube for freezing the gallium therein, the second U-tube being outside the jacket, and means for sucking unfrozen gallium downward in the leg of the second U-tube that is connected to the bottom of the first U-tube so as to produce an evacuated space in said leg between frozen gallium in the first U-tube and unfrozen gallium in the second U-tube.

References Cited in the file of this patent

UNITED STATES PATENTS

| | | |
|---|---|---|
| 846,078 | Wood | Mar. 5, 1907 |
| 1,065,690 | Kopper | June 24, 1913 |
| 1,468,030 | Pearson | Sept. 18, 1923 |
| 2,642,891 | Harrison | June 23, 1953 |
| 2,646,065 | Tyson | July 21, 1953 |

FOREIGN PATENTS

| | | |
|---|---|---|
| 524,506 | Great Britain | Aug. 8, 1940 |

OTHER REFERENCES

Journal of Metals, published February 1951, vol. 191, issue 2, pp. 91–94 (copy in Div. 3).

Thorpes Dictionary of Applied Chemistry, published by Longmans, Green & Co., vol. V (Teh-Glass) pp. 418–419 (copy in Div. 59).